(12) United States Patent
Cheung

(10) Patent No.: US 10,752,371 B2
(45) Date of Patent: Aug. 25, 2020

(54) TRANSLATING NACELLE WALL FOR AN AIRCRAFT TAIL MOUNTED FAN SECTION

(71) Applicant: General Electric Company, Schenectady, NY (US)

(72) Inventor: Lawrence Chih-hui Cheung, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 895 days.

(21) Appl. No.: 15/282,098

(22) Filed: Sep. 30, 2016

(65) Prior Publication Data
US 2018/0093777 A1    Apr. 5, 2018

(51) Int. Cl.
*B64D 29/06* (2006.01)
*B64C 7/02* (2006.01)
(Continued)

(52) U.S. Cl.
CPC .............. *B64D 29/06* (2013.01); *B64C 7/02* (2013.01); *B64C 11/28* (2013.01); *B64C 21/06* (2013.01); *B64C 23/00* (2013.01); *B64D 27/02* (2013.01); *B64D 27/18* (2013.01); *B64D 27/24* (2013.01); *B64D 29/04* (2013.01); *F02K 1/06* (2013.01); *F02K 1/52* (2013.01); *B64D 2027/026* (2013.01)

(58) Field of Classification Search
CPC ... B64C 11/28; B64C 1/16; B64C 7/02; F02K 1/09; F02K 1/10; B64D 29/06–08
See application file for complete search history.

(56) References Cited

U.S. PATENT DOCUMENTS

| 2,597,663 | A | * | 5/1952 | Michard | ................ | B64D 29/06 |
| | | | | | | 123/41.59 |
| 3,391,869 | A | * | 7/1968 | Glass | ....................... | F02K 1/08 |
| | | | | | | 239/127.3 |

(Continued)

FOREIGN PATENT DOCUMENTS

| CN | 201385780 Y | 1/2010 |
| CN | 204110358 U | 1/2015 |

(Continued)

OTHER PUBLICATIONS

"717/MD-95 Commercial Transport", Boeing, https://www.boeing.com/history/products/717-md-95.page (Year: 2016).*

(Continued)

*Primary Examiner* — Joshua T Semick
(74) *Attorney, Agent, or Firm* — Dority & Manning, P.A.

(57) ABSTRACT

The present disclosure is directed to a fan section positioned on a tail section of an aircraft, in which the fan section defines a circumferential direction, a radial direction, and an axial direction. The fan section includes a fan and a nacelle. The fan includes a plurality of fan blades and a fan shaft, in which the plurality of fan blades are rotatable with the shaft. The nacelle includes a wall at least partially enclosing the fan. The wall includes a first portion and a second portion. The first portion translates relative to the second portion between a first, closed position in which the wall of the nacelle circumferentially encloses the fan and a second, open position in which at least a portion of the fan is unenclosed by the wall of the nacelle.

20 Claims, 2 Drawing Sheets

(51) Int. Cl.
*B64D 27/02* (2006.01)
*F02K 1/06* (2006.01)
*B64C 11/28* (2006.01)
*B64C 23/00* (2006.01)
*F02K 1/52* (2006.01)
*B64C 21/06* (2006.01)
*B64D 27/18* (2006.01)
*B64D 27/24* (2006.01)
*B64D 29/04* (2006.01)

(56) References Cited

U.S. PATENT DOCUMENTS

| | | | | |
|---|---|---|---|---|
| 4,394,109 A | * | 7/1983 | Ritchie | F01D 7/00 416/142 |
| 4,585,189 A | * | 4/1986 | Buxton | B64D 29/08 244/129.4 |
| 5,000,399 A | * | 3/1991 | Readnour | B64D 33/02 244/130 |
| 5,213,286 A | * | 5/1993 | Elliott | B64D 29/06 16/368 |
| 5,524,847 A | * | 6/1996 | Brodell | B64C 7/02 244/54 |
| 5,737,914 A | * | 4/1998 | Porte | B64D 29/00 244/129.4 |
| 5,782,432 A | * | 7/1998 | Renshaw | B64D 33/04 239/265.19 |
| 6,065,933 A | | 5/2000 | Secord | |
| 7,716,932 B2 | * | 5/2010 | Core | B64D 33/06 239/265.33 |
| 7,802,432 B2 | * | 9/2010 | Erno | B05B 1/30 239/455 |
| 7,857,591 B2 | | 12/2010 | Gajewski et al. | |
| 7,966,828 B2 | * | 6/2011 | Cini | F02K 1/09 239/265.19 |
| 8,091,832 B2 | * | 1/2012 | Marche | B64D 29/08 244/129.5 |
| 8,152,096 B2 | | 4/2012 | Smith | |
| 8,181,905 B2 | * | 5/2012 | McDonough | B64D 29/00 137/15.1 |
| 8,226,027 B2 | * | 7/2012 | Journade | B64D 29/08 244/1 N |
| 8,821,118 B2 | | 9/2014 | Moore et al. | |
| 9,188,026 B2 | * | 11/2015 | Calder | B64D 29/06 |
| 9,783,315 B2 | * | 10/2017 | James | B64D 29/08 |
| 9,915,207 B2 | * | 3/2018 | Schaeffer | F02P 15/003 |
| 10,060,292 B2 | * | 8/2018 | Sawyers-Abbott | F01D 25/246 |
| 10,081,434 B2 | * | 9/2018 | Lozano | B64D 29/08 |
| 10,100,780 B2 | * | 10/2018 | Tissot | F02K 1/09 |
| 10,107,196 B2 | * | 10/2018 | Devine | F02C 7/042 |
| 10,144,500 B2 | * | 12/2018 | Pautis | B64D 29/08 |
| 10,252,797 B2 | * | 4/2019 | Vondrell | B64C 3/32 |
| 2008/0308684 A1 | * | 12/2008 | Chaudhry | B64D 29/00 244/53 B |
| 2009/0274557 A1 | | 11/2009 | Vasyl | |
| 2012/0280082 A1 | | 11/2012 | Calder et al. | |
| 2018/0093754 A1 | | 4/2018 | Cheung | |
| 2018/0141673 A1 | * | 5/2018 | Lu | B64D 29/06 |

FOREIGN PATENT DOCUMENTS

| | | | | |
|---|---|---|---|---|
| EP | 1589194 B1 | * | 7/2010 | F01D 25/246 |
| EP | 2 982 855 A1 | | 2/2016 | |
| WO | 2014072615 A1 | | 5/2014 | |

OTHER PUBLICATIONS

International Search Report and Written Opinion issued in connection with corresponding PCT Application No. PCT/US2017/053135 dated Dec. 12, 2017.

Huete et al., "A novel concept for the next generation civil supersonic transport propulsion system: the retractable fan", Aircraft Engineering and Aerospace Technology, vol. 69, Issue: 6, pp. 512-517, 1997.

\* cited by examiner

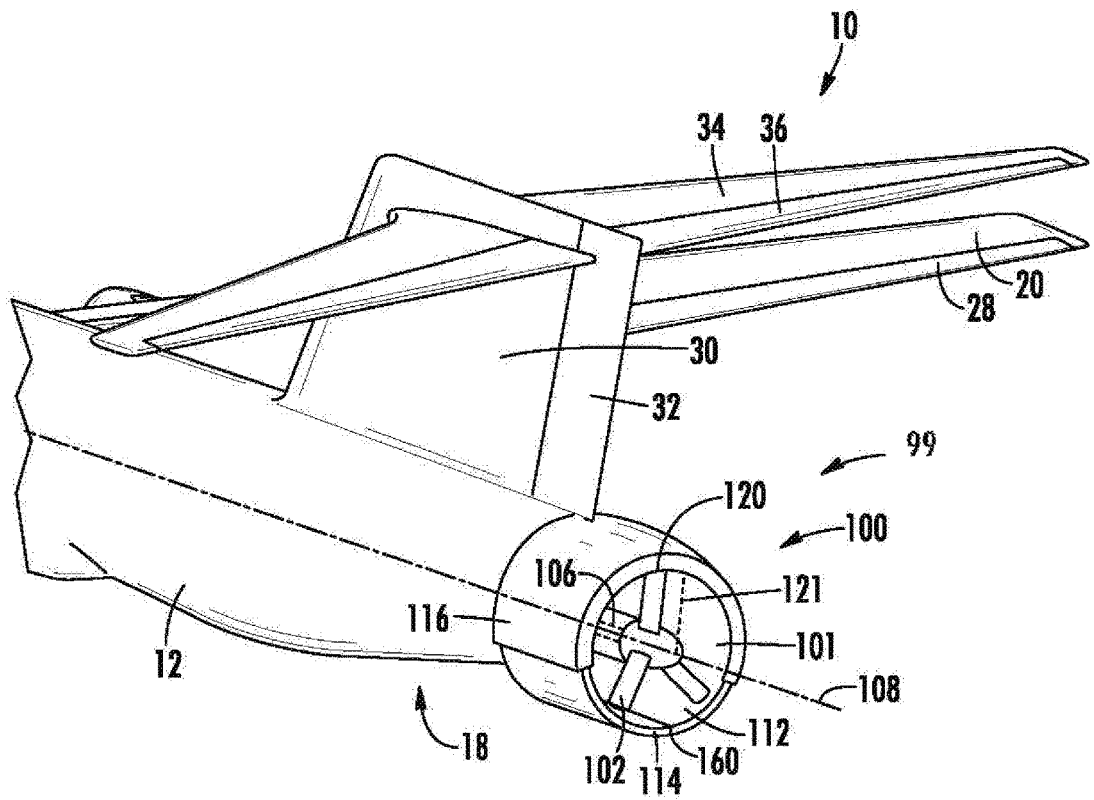
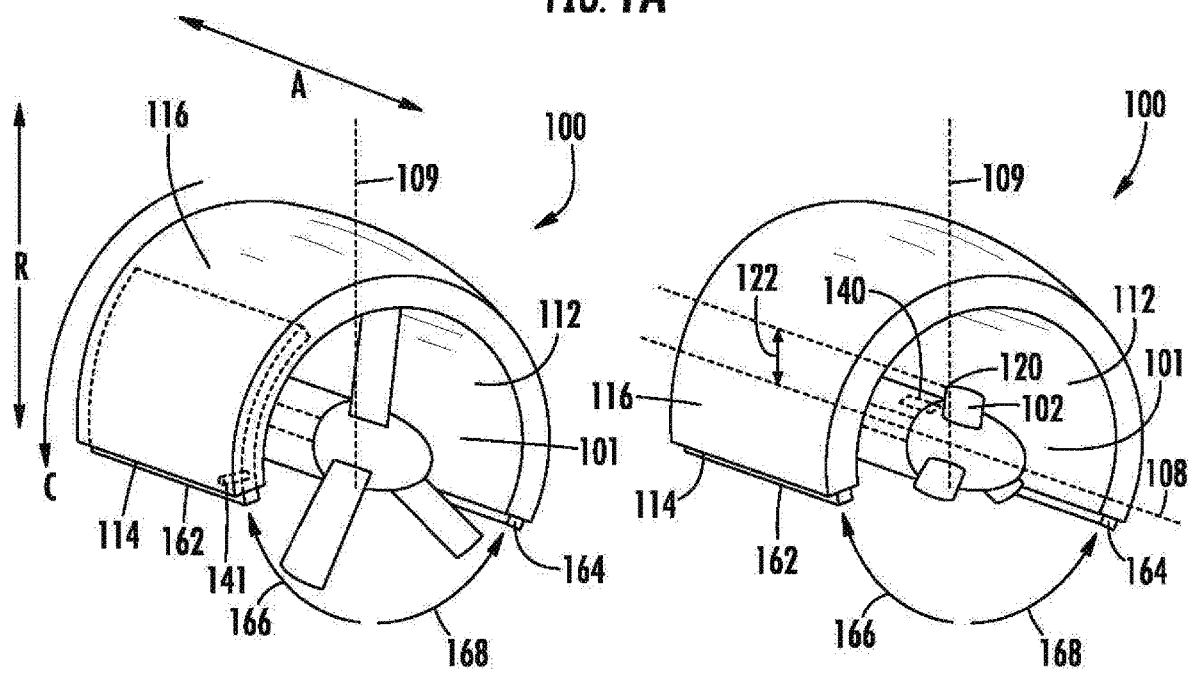
FIG. 1A
FIG. 1B
FIG. 1C

US 10,752,371 B2

TRANSLATING NACELLE WALL FOR AN AIRCRAFT TAIL MOUNTED FAN SECTION

FIELD OF THE INVENTION

The present invention relates generally to a fan section of an aircraft tail section.

BACKGROUND OF THE INVENTION

Aircraft and engine designs are challenged to drive ever-increasingly toward lower fuel consumption and emissions. One known solution to increase aircraft efficiency is to mount a hybrid-electric fan section at or near the tail-section of an aircraft.

However, similar to a conventional, under-wing fan configuration, a diameter of a fan section is limited by the available ground clearance of an aircraft during takeoff roll and landing. A known solution is to remove the fan nacelle to provide an open-rotor configuration. However, removing a fan nacelle may reduce fan efficiency. Additionally, fan nacelles provide noise suppression and fan blade containment protection, without which the benefits of an open-rotor configuration may be offset by increased noise and loss of fan blade containment capability.

Therefore, a need exists for a fan section mounted to an aircraft tail section that may overcome fan diameter restrictions due to aircraft ground clearance while also providing aircraft efficiency, noise suppression, and/or fan blade containment benefits.

BRIEF DESCRIPTION OF THE INVENTION

Aspects and advantages of the invention will be set forth in part in the following description, or may be obvious from the description, or may be learned through practice of the invention.

The present disclosure is directed to a fan section positioned on a tail section of an aircraft, in which the fan section defines a circumferential direction, a radial direction, and an axial direction. The fan section includes a fan and a nacelle. The fan includes a plurality of fan blades and a fan shaft, in which the plurality of fan blades are rotatable with the shaft. The nacelle includes a wall at least partially enclosing the fan. The wall includes a first portion and a second portion. The first portion translates relative to the second portion between a first, closed position in which the wall of the nacelle circumferentially encloses the fan and a second, open position in which at least a portion of the fan is unenclosed by the wall of the nacelle.

A further aspect of the present disclosure is directed to an aircraft including a fuselage defining an aft end and an engine attached to the fuselage at the aft end of the fuselage. The engine includes a fan section defining a circumferential direction, a radial direction, and an axial direction. The fan section includes a fan, including a plurality of fan blades rotatable with a fan shaft, and a nacelle. The nacelle includes a wall, including a first portion and a second portion, at least partially enclosing the fan. The first portion translates relative to the second portion between a first, closed position in which the wall of the nacelle circumferentially encloses the fan and a second, open position in which at least a portion of the fan is unenclosed by the wall of the nacelle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1A is a perspective view of an exemplary embodiment of an aircraft tail mounted fan section showing a plurality of fan blades at a first radial position and a nacelle in a first position;

FIG. 1B is a perspective view of an exemplary embodiment of the fan section of FIG. 1A showing the plurality of fan blades at the first radial position and the nacelle in a second position FIG. 1C is a perspective view of an exemplary embodiment of the fan section of FIG. 1A showing the plurality of fan blades at a second radial position and the nacelle at the second position;

Figure 2:
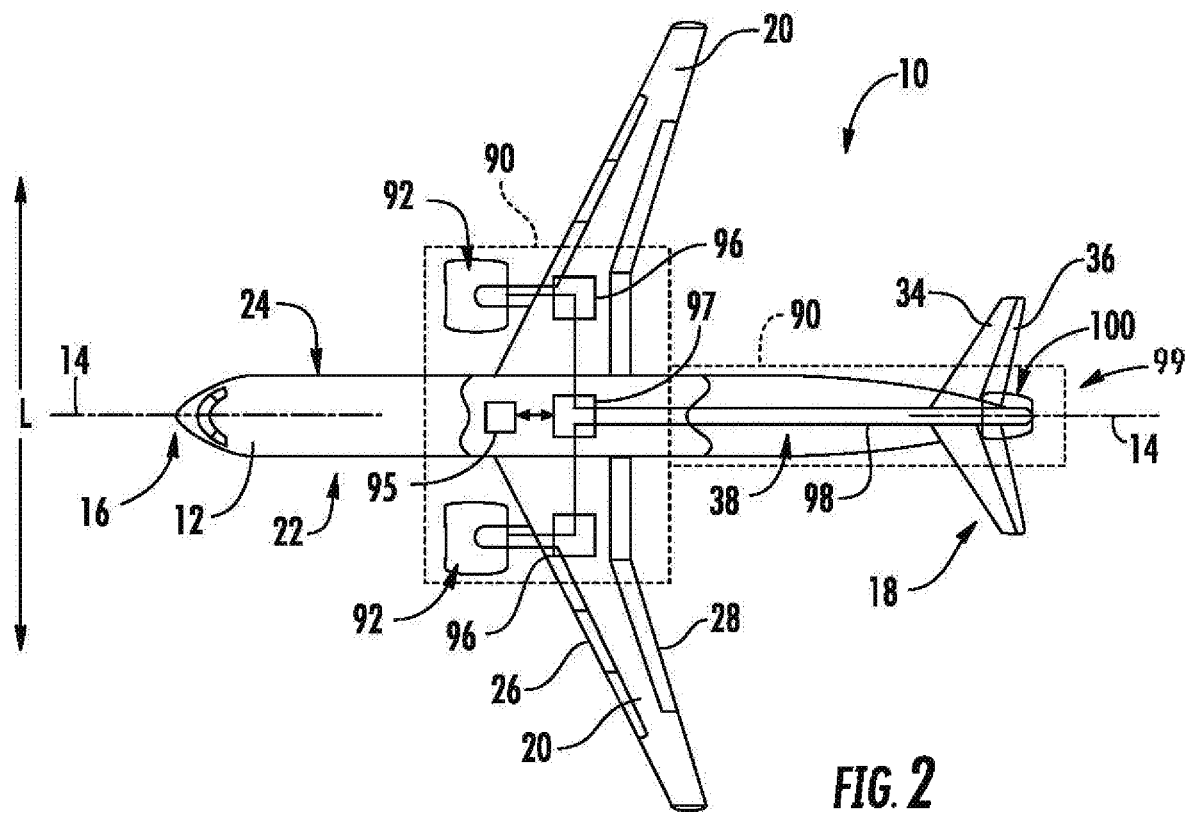
FIG. 2 is a top view of an exemplary embodiment of an aircraft including an exemplary embodiment of a tail mounted fan section.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

A fan section positioned on an aircraft tail section including a nacelle with a translating wall is generally provided. The fan section including the nacelle with a translating wall may overcome fan section diameter restrictions due to aircraft ground clearance by translating a first portion of the nacelle wall relative to a second portion. The first portion is translatable between a first, closed position in which the wall circumferentially encloses the fan, and a second, open position in which at least a circumferential portion of the fan is unenclosed. Translating the first portion of the wall to the open position may provide sufficient ground clearance during aircraft takeoff roll and landing while enabling larger diameter fan sections to be mounted at the tail section of the aircraft. The large diameter fan section may capture and energize low momentum boundary layer fluid from a surface of a fuselage of the aircraft, thereby increasing aircraft efficiency and reducing fuel consumption and emissions.

Referring now to the drawings, FIGS. 1A, 1B, and 1C are perspective views of an exemplary embodiment of a fan section 100. Specifically, FIG. 1A provides a perspective view of the exemplary fan section 100 mounted onto a tail section of an aircraft 10, with a first portion of a wall in a closed position; FIG. 1B provides a perspective view of the exemplary fan section 100, with the first portion of the wall in an open position; and FIG. 1C provides a perspective view of the exemplary fan section 100, with one or more of a plurality of fan blades in the retracted position.

As is depicted, the fan section 100 generally defines an axial direction A, a radial direction R, and a circumferential direction C. Further, the fan section 100 includes a fan 101 and a nacelle 110. The fan 101 includes a plurality of fan blades 102 and a shaft 106. Each fan blade 102 defines an outer end 120 along the radial direction, relative to a longitudinal axis 108 of the fan section 100. At least one fan blade 102 of the fan section 100 translates from an extended position, wherein the fan blade 102 is in a first radial position 121 (shown in FIG. 1A), to a retracted position, wherein the fan blade 102 is in a second radial position 122 (shown in FIG. 1C). Additionally, each fan blade 102 is rotatable with the shaft 106. In one embodiment, each fan blade 102 is coupled to a hub 104, which in turn is attached to the shaft 106. As is depicted, each of the plurality of fan blades 102 is spaced generally along the circumferential direction. The hub 104, the shaft 106, and plurality of fan blades 102 are each rotatable about the longitudinal axis 108.

The nacelle 110 includes a wall 112 that at least partially encloses the fan 101. The wall 112 includes a first portion 114 and a second portion 116. The first portion 114 translates relative to the second portion 116. More specifically, the nacelle 110 translates the first portion 114 of the wall 112 from a first, closed position (shown in FIG. 1A) to a second, open position (shown in FIGS. 1B and 1C). When the first portion 114 of the wall 112 is in the closed position, the wall 112 circumferentially encloses the fan 101. By contrast, when the first portion of the wall 112 is in the second position, at least a portion of the fan 101 in the circumferential direction C is unenclosed.

Referring still to FIGS. 1A, 1B and 1C, the nacelle 110 may translate at least a portion of the first portion 114 of the wall 112 into the second portion 116 of the wall 112 along the circumferential direction C, such that at least a segment of the first portion 114 is nested within the second portion 116. Additionally, for the embodiment depicted, the first portion 114 of the wall 112 includes a first section 162 and a second section 164. The first section 162 translates clockwise along the circumferential direction (as viewed from an aft end, such as in the view of FIGS. 1A through 1B) to overlap, or nest within, at least a segment of the second portion 116 of the wall 112. The second section 164 translates counterclockwise (as viewed from an aft end, such as in the view of FIGS. 1A through 1B) to overlap, or nest within, a segment of the second portion 116 of the wall 112. It should be appreciated, however, that in other exemplary embodiments, the first portion 114 may not include two sections (i.e., sections 162, 164), and instead, the first portion as a whole may translate relative to the second portion 116 to open up the nacelle 110.

The first and second sections 162, 164 define a split 160 when the first portion 114 translates to the open position (shown in FIGS. 1B and 1C). In one embodiment, the first section 162 defines a first length 166 along the circumferential direction and the second section 164 defines a second length 168 along the circumferential direction. In the embodiments shown in FIGS. 1A, 1B and 1C, the first length 166 may be approximately equal to the second length 168 along the circumferential direction C. The first length 166 and the second length 168 of the first portion 162 of the wall 112 may together define an approximately 120 degree segment of the wall 112 along the circumferential direction C when the first portion 162 is in the open position.

In one embodiment, the split 160 between the first and second sections 162, 164 may be at about a bottom dead center (BDC) position (i.e. 180 degrees relative to a vertical reference line 109). In other embodiments, the split 160 between the first section 162 and the second section 164 of the first portion 114 of the wall 112 may define the first length 166 to be unequal to the second length 168 along the circumferential direction C. In one embodiment in which the first length 166 and second length 168 together define a 120 degree segment of the wall 112 along the circumferential direction C, the split 160 may be defined at other than BDC such that the first length 166 defines at least a 60 degree segment and the second length 168 defines at most a 60 degree segment.

Referring to the embodiments shown in FIGS. 1A and 1B, the nacelle 110 may further include a nacelle locking mechanism 141 to lock the first section 162 and/or second section 164 to a circumferentially stationary position. For example, the nacelle locking mechanism 141 may be a pin attached to the second portion 116 of the wall 112 of the nacelle 110 and extendable into an opening defined by the first portion 114 of the wall 112. The nacelle locking mechanism 141 may lock the first section 162 and/or the second section 164 of the first portion 114 of the wall 112 in a circumferentially stationary position such that the first portion 114 may be locked from rotating over the first and second lengths 166, 168 when in the open position.

Referring still to the embodiments shown in FIGS. 1A, 1B, and 1C, the outer end 120 of each fan blade 102 is the outermost portion of the fan blade 102 along the radial direction R relative to the longitudinal axis 108 (e.g. the airfoil tip). In the embodiments shown in FIGS. 1A and 1B, the first radial position 121 refers to a position of the outer end 120 of the fan blade 102 at its outermost position. The second radial position 122 refers to a position of the outer end 120 of the fan blade 102 at its innermost position. For the embodiment depicted, the fan blades 102 each translate generally along the radial direction R between an extended position (at the first radial position 121) and a retracted position (at the second radial position 122). Notably, for the embodiment depicted in FIG. 1C, when in the retracted position, the outer end 120 of each fan blade 102 is positioned proximate the hub 104 such that the second radial position 122 may be approximately equal to an outer diameter of the hub 104. It should be appreciated, however, that although not depicted, in other exemplary embodiments, the second radial position 122 may be less than the outer diameter of the hub 104, such that the fan blade 102 is completely retracted within the hub 104 when in the retracted position.

As shown in the embodiments in FIGS. 1A, 1B, and 1C, the fan section 100 may be configured to translate the first portion 114 of the wall 112 of the nacelle 110 from the first, closed position (shown in FIG. 1A) to the second, open position (shown in FIGS. 1B and 1C) to provide sufficient ground clearance during takeoff roll and landing. Additionally, the outer ends 120 of the fan blades 102 may translate between the extended position (at the first radial position 121, shown in FIGS. 1A and 1B) and the retracted position (at the second radial position 122, shown in FIG. 1C). In one embodiment, the plurality of fan blades 102 each translate inwardly along the radial direction R to a retracted position representing at least a 25% decrease in a radius of the respective fan blade 102 from the extended position. Translating the outer end 120 of the fan blades 102 may provide clearance between the outer end 120 and the wall 112 of the nacelle 110 during translation of the wall 112 from the first, closed position (shown in FIG. 1A) to the second, open position (shown in FIGS. 1B and 1C). Additionally, translating the outer end 120 of the fan blades 102 may provide additional ground clearance for the aircraft 10 during takeoff or landing when the wall 112 is retracted to the second, open position.

Referring still to the embodiments shown in FIGS. 1A, 1B, and 1C, the fan section 100 may include a locking mechanism 140 to position the plurality of fan blades 102 in a circumferentially stationary position (i.e. the fan section 100 not rotating about the longitudinal axis 108). For example, the locking mechanism 140 may be a pin attached to a circumferentially stationary portion of the fan section 100 or the fuselage 12 (shown in FIG. 2) and extendable into an opening defined by the hub 104 by an actuator. The locking mechanism 140 may lock the fan blades 102 in a circumferentially stationary position such that an extended fan blade 102 may be locked from rotating over the first and second lengths 166, 168 in the open position.

Figure 3:
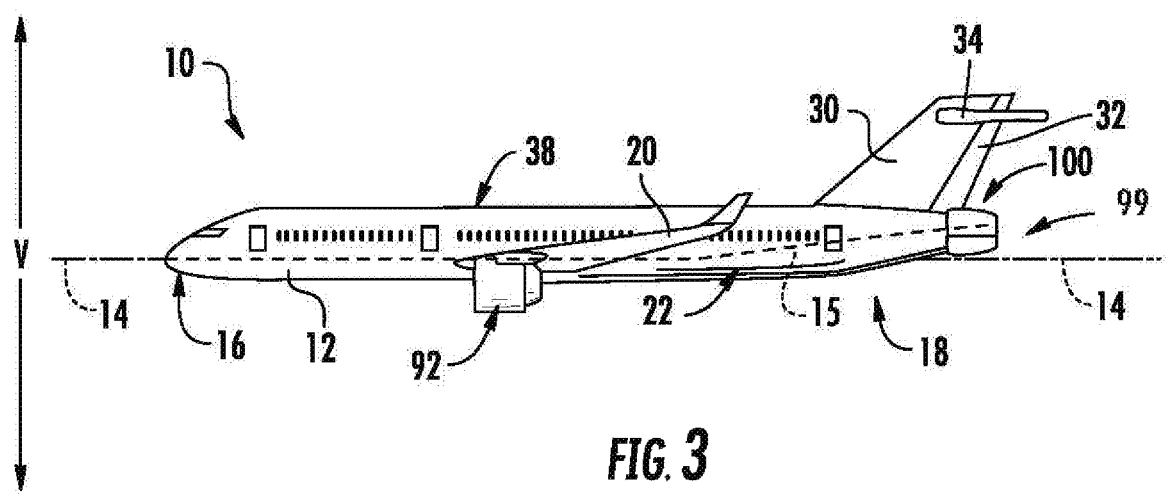
FIG. 3 is a port side view of the exemplary aircraft shown in FIG. 2.

Referring now to FIG. 2, a top view of an exemplary aircraft 10 as may incorporate various embodiments of a fan section 100 described herein is provided. Additionally, FIG. 3 provides a port side view of the aircraft 10 as illustrated in FIG. 2. As shown in FIGS. 2 and 3 collectively, the aircraft 10 includes a powerplant 90, a fuselage 12, and a plurality of wings 20. The aircraft 10 further includes an engine 99 at an aft end 18 of the fuselage 12. The engine 99 includes the fan section 100, according to various embodiments shown in FIGS. 1-4 and described herein, positioned aft of a vertical stabilizer 30 included with the fuselage 12.

Referring still to FIGS. 2 and 3, the aircraft 10 defines a longitudinal centerline 14 that extends therethrough, a vertical direction V, a lateral direction L, a forward end 16, and an aft end 18. Moreover, the aircraft 10 defines a mean line 15 extending between the forward end 16 and aft end 18 of the aircraft 10. As used herein, the "mean line" refers to a midpoint line extending along a length of the aircraft 10, not taking into account the appendages of the aircraft 10 (such as the wings 20 and stabilizers discussed below).

The engine 99, including the fan section 100, is mounted at the aft end 18 of the aircraft 10. More specifically, for the embodiment depicted, the fan section 100 is aft of the vertical stabilizer 30. Further, the fan section 100 depicted may ingest and consume at least a portion of air forming a boundary layer over the fuselage 12 of the aircraft 10. Specifically, for the embodiment depicted, the fan section 100 is fixedly connected to the fuselage 12 at the aft end 18, such that the fan section 100 is incorporated into a tail section at the aft end 18, and such that the mean line 15 extends therethrough.

Still more specifically, the fan section 100 may be positioned at a region of the aft end 18 of the fuselage 12 at the tail section where thick fluid boundary layers from the outer surface 38 of the fuselage 12 create a relatively large region of low momentum fluid. The placement of the fan section 100 at the aft end 18 of the fuselage 12 to ingest a relatively low momentum boundary layer fluid increases the efficiency of the aircraft 10. The translating fan blades 102 of the fan section 100 may avoid contact with the ground during aircraft takeoff roll and landing. In another embodiment, the translating fan blades 102 may position the first radial position 121 of the outer end 120 of the fan blades 102 within 100% of the fluid boundary layer, or a lesser portion thereof to maximize efficiency. In yet another embodiment, the translating fan blades 102 may position the second radial position 122 of the outer end 120 of the fan blades 102 to avoid ground contact during takeoff roll or landing, and position the first radial position 121 within a portion of the fluid boundary layer that may yield maximum efficiency. For example, the translating fan blades 102 may position the outer end 120 within 60% of the fluid boundary layer, or 50%, or 45%, etc. during takeoff or landing while avoiding contact with the ground. Still further, as boundary layer conditions change, the fan section 100 may re-position the outer end 120 of the fan blades 102 from the first radial position 121 to the second radial position 122 to maximize efficiency. Notably, in this embodiment, or in other embodiments, the fan section 100 may further include a locking mechanism (not shown) for locking the fan blades 102 in a desired radial position. The locking mechanism may be operable with the fan blades 102 directly (e.g., a pin or clamp member), or alternatively may be operable with an actuator configured to translate the fan blades 102.

The fuselage 12 extends longitudinally from the forward end 16 of the aircraft 10 towards the aft end 18 of the aircraft 10, and includes a plurality of wings 20 of the aircraft 10 attached thereto. As used herein, the term "fuselage" generally includes all of the body of the aircraft 10, including an empennage or tail section of the aircraft 10. The first of such wings 20 extends laterally outwardly with respect to the longitudinal centerline 14 from a port side 22 of the fuselage 12 and the second of such wings 20 extends laterally outwardly with respect to the longitudinal centerline 14 from a starboard side 24 of the fuselage 12. Each of the wings 20 for the exemplary embodiment depicted includes one or more leading edge flaps 26 and one or more trailing edge flaps 28. The fuselage 12 further includes the vertical stabilizer 30, including a rudder flap 32 for yaw control, and a pair of horizontal stabilizers 34 each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration of stabilizer that may or may not extend directly along the vertical direction V or horizontal/lateral direction L. Such examples include, but are not limited to, T-tail, cruciform tail, twin or triple tails, or V-tails.

The exemplary powerplant 90 included in the aircraft 10 shown in FIGS. 2 and 3 includes one or more gas turbine engines 92 and a fan section 100. The one or more gas turbine engines 92 to generate an amount of thrust, and further may produce power to drive the fan section 100. As will be appreciated, the fan section 100 is, for the embodiment depicted, attached to the aft end of the aircraft, to the fuselage of the aircraft. The fan section 100 may ingest and re-energize a boundary layer airflow over the fuselage of the aircraft to improve a propulsive efficiency of the aircraft. In certain embodiments, the fan section 100 may include one or more fan blades 102 that translate between an extended position and a retracted position to increase a ground clearance during takeoff and landing. More specifically, in certain embodiments, the fan section 100 may be configured in accordance with one or more of the embodiments described above with reference to FIGS. 1A-1C.

Referring still to FIGS. 2 and 3, the powerplant 90 may further include an electrical powertrain 94 to convert, store, and distribute electrical energy to the fan section 100. In one embodiment, the engines 92 include electrical generators to provide energy for the aircraft 10 and the fan section 100. In another embodiment, as shown in FIG. 2, the powerplant 90 includes at least one electrical generator 96 separate from the engines 92. For example, the electrical generators 96 may include auxiliary power units (APUs) placed within the wings 20 or at the empennage near the aft end 18 of the aircraft 10. The engines 92 or electrical generators 96 transmit electrical energy to an energy storage device 95. The energy storage device 95 may be, for example, but not limited to, capacitors, batteries, or fuel cells to store energy for later use.

The energy storage device 95 may be used to provide energy to operate the fan section 100 to generate propulsive force or to translate the outer end 120 of the fan blades 102 independently of the power output or rotational speed of the engines 92. For example, the fan section 100 may translate the fan blades 102 or provide thrust while the engines 92 are non-operating, or while the engines 92 are operating at a reduced power output, using energy transmitted from the energy storage device 95.

The electrical powertrain 94 may further include a power conditioner 97, such as, for example, a rectifier, or transformer, or alternator. However, it should be understood that electrical generators 96 may include a power conditioning means that may obviate the inclusion of a separate power conditioner 97 (e.g. a variable frequency generator system as the electrical generator 96). Therefore, in other embodiments, the electrical generators 96 may be configured in direct communication with the energy storage device 95 without a separate power conditioner 97 therebetween. The electrical powertrain 94 may further include a communications apparatus 98 to distribute energy to the fan section 100 and to receive and communicate load requirements to and from the fan section 100.

It should be appreciated, however, that in other embodiments the present disclosure, the fan section 100 may instead receive mechanical energy from a powerplant 90 including engines 92 mounted at the aft end 18 of the fuselage 12 of the aircraft 10, such as e.g. at the vertical stabilizer 30, or the within the tail section of the fuselage 12, or along the port side 22 or starboard side 24 of the fuselage 12 at the aft end 18 of the aircraft 10. The engines 92 may transmit mechanical energy to the fan section 100 by mechanically coupling the fan section 100 to the engine 92, such as, for example, by coupling the shaft 106 of the fan section 100 to a shaft and/or gearbox of the engines 92. The engines 92 transmitting mechanical energy to the fan section 100 may include e.g. turbofan, turbojet, or turboprop engines that also provide propulsive thrust for the aircraft 10, or a turboshaft engine, such as an APU, to also provide electrical energy to the aircraft 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fan section positioned on a tail section of an aircraft, wherein the fan section defines a circumferential direction, a radial direction, and an axial direction, the fan section comprising:
    a fan comprising a plurality of fan blades and a fan shaft, wherein the plurality of fan blades are rotatable with the shaft; and
    a nacelle comprising a wall at least partially enclosing the fan, wherein the wall includes a first portion and a second portion, and wherein the first portion translates relative to the second portion between a first, closed position in which the wall of the nacelle circumferentially encloses the fan and a second, open position in which at least a portion of the fan is unenclosed by the wall of the nacelle;
    wherein when the first portion is in the closed position the first portion is positioned outward from the plurality of fan blades of the fan along the radial direction and aligned with the plurality of fan blades of the fan along the axial direction, and wherein the first portion defines in part an aft edge of the nacelle when in the closed position.

2. The fan section of claim 1, wherein the nacelle translates the first portion from the closed position to the open position along the circumferential direction.

3. The fan section of claim 1, wherein at least a segment of the first portion of the wall of the nacelle translates into the second portion of the wall along the circumferential direction, and wherein at least a segment of the first portion is nested within the second portion.

4. The fan section of claim 1, wherein the first portion comprises a first section and a second section, and wherein the first section translates clockwise along the circumferential direction as viewed from an aft end to overlap at least a segment of the second portion of the wall, and wherein the second section translates counterclockwise as viewed from the aft end to overlap a segment of the second portion of the wall.

5. The fan section of claim 4, wherein the first section and the second section define a split when the first portion translates to the open position, and wherein the first section defines a first length along the circumferential direction, and wherein the second section defines a second length along the circumferential direction.

6. The fan section of claim 5, wherein the first length and the second length together define an approximately 120 degree segment of the wall along the circumferential direction when the first portion is in the open position.

7. The fan section of claim 5, wherein the first length is approximately equal to the second length along the circumferential direction.

8. The fan section of claim 1, wherein at least one fan blade translates between an extended position along the radial direction and a retracted position along the radial direction.

9. The fan section of claim 8, wherein one or more fan blades translates inwardly along the radial direction to a retracted position representing at least a 25% decrease in a radius of the fan blades from the extended position.

10. The fan section of claim 1, the fan section further comprising:

a locking mechanism, wherein the locking mechanism positions the plurality of fan blades in a circumferentially stationary position.

11. The fan section of claim 1, wherein the first portion extends from a forward edge of the nacelle to the aft edge of the nacelle when in the closed position.

12. An aircraft comprising:
a fuselage defining an aft end; and
an engine attached to the fuselage at the aft end of the fuselage, the engine comprising a fan section defining a circumferential direction, a radial direction, and an axial direction, wherein the fan section comprises:
 a fan comprising a plurality of fan blades and a fan shaft, wherein the plurality of fan blades are rotatable with the shaft; and
 a nacelle comprising a wall at least partially enclosing the fan, wherein the wall includes a first portion and a second portion, and wherein the first portion translates relative to the second portion between a first, closed position in which the wall of the nacelle circumferentially encloses the fan and a second, open position in which at least a portion of the fan is unenclosed by the wall of the nacelle;
 wherein when the first portion is in the closed position the first portion is positioned outward from the plurality of fan blades of the fan along the radial direction and aligned with the plurality of fan blades of the fan along the axial direction, and
 wherein the first portion defines in part an aft edge of the nacelle when in the closed position.

13. The aircraft of claim 12, wherein the nacelle translates the first portion from the closed position to the open position along the circumferential direction.

14. The aircraft of claim 12, wherein the first portion of the nacelle comprises a first section and a second section, and wherein the first section translates clockwise along the circumferential direction as viewed from an aft end to overlap at least a segment of the second portion of the wall, and wherein the second section translates counterclockwise as viewed from the aft end to overlap a segment of the second portion of the wall.

15. The aircraft of claim 14, wherein the first section and the second section define a split when the first portion translates to the open position, and wherein the first section defines a first length along the circumferential direction, and wherein the second section defines a second length along the circumferential direction.

16. The aircraft of claim 15, wherein the first length and the second length together define an approximately 120 degree segment of the wall along the circumferential direction when the first portion is in the open position.

17. The aircraft of claim 12, wherein at least one fan blade translates between an extended position along the radial direction and a retracted position along the radial direction.

18. The aircraft of claim 12, wherein the nacelle ingests at least a portion of a fluid boundary layer of the fuselage of the aircraft.

19. The aircraft of claim 12, wherein the fan section is mounted along a mean line of the aircraft.

20. A fan section positioned on a tail section of an aircraft, wherein the fan section defines a circumferential direction, a radial direction, and an axial direction, the fan section comprising:
 a fan comprising a plurality of fan blades and a fan shaft, wherein the plurality of fan blades are rotatable with the shaft; and
 a nacelle comprising a wall at least partially enclosing the fan, wherein the wall includes a first portion and a second portion, and wherein the first portion translates relative to the second portion between a first, closed position in which the wall of the nacelle circumferentially encloses the fan and a second, open position in which at least a portion of the fan is unenclosed by the wall of the nacelle;
 wherein the first portion comprises a first section and a second section, and wherein the first section translates clockwise along the circumferential direction as viewed from an aft end to overlap at least a segment of the second portion of the wall, and wherein the second section translates counterclockwise as viewed from the aft end to overlap a segment of the second portion of the wall; and
 wherein the first portion defines in part an aft edge of the nacelle when in the closed position.

* * * * *